United States Patent
Kearney-Fischer et al.

(10) Patent No.: US 10,458,757 B1
(45) Date of Patent: Oct. 29, 2019

(54) DEPLOYABLE NET FOR AN INTERCEPTING VEHICLE

(71) Applicant: Aurora Flight Sciences Corporation, Manassas, VA (US)

(72) Inventors: Martin Kearney-Fischer, Boston, MA (US); Lauren Trollinger, Somerville, MA (US); Jason Wallace, Medford, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 16/037,777

(22) Filed: Jul. 17, 2018

(51) Int. Cl.
*F41H 11/02* (2006.01)
*B64C 39/02* (2006.01)

(52) U.S. Cl.
CPC ............ *F41H 11/02* (2013.01); *B64C 39/024* (2013.01); *B64C 2201/024* (2013.01); *B64C 2201/12* (2013.01)

(58) Field of Classification Search
CPC ....................................................... F41H 11/02
USPC .................................. 89/1.34, 1.11
See application file for complete search history.

(56) References Cited

U.S. PATENT DOCUMENTS

| | | | | |
|---|---|---|---|---|
| 5,675,104 A * | 10/1997 | Schorr | ...................... | F21S 2/00 102/403 |
| 7,786,417 B2 * | 8/2010 | Sells, II | .................. | F41H 11/02 102/400 |
| 8,387,507 B2 * | 3/2013 | Johnson | ................... | F41H 11/02 89/1.1 |
| 8,399,816 B2 * | 3/2013 | Glasson | .............. | F41H 13/0006 244/1 R |
| 10,005,556 B2 * | 6/2018 | Rastgaar Aagaah | ........................ | B64C 39/024 |
| 2012/0011996 A1 * | 1/2012 | Glasson | ................... | F41H 11/04 89/36.17 |
| 2016/0251088 A1 * | 9/2016 | Melish | ...................... | B64F 1/02 244/110 C |
| 2016/0376029 A1 * | 12/2016 | Sekiya | .................... | F41H 11/02 244/110 F |
| 2018/0162530 A1 * | 6/2018 | Klein | ....................... | B64C 39/02 |
| 2018/0244401 A1 * | 8/2018 | Kilian | ....................... | B64F 1/02 |

OTHER PUBLICATIONS

SKYNET Mi-5, ALS, https://www.lesslethal.com/products/12-gauge/als12skymi-5-detail, Jul. 3, 2018, US.
SkyWall100, Openworks, https://openworksengineering.com/skywall/100, Jul. 3, 2018, England.

(Continued)

*Primary Examiner* — Reginald S Tillman, Jr.
(74) *Attorney, Agent, or Firm* — McDonnell Boehnen Hulbert & Berghoff LLP

(57) ABSTRACT

An intercepting vehicle includes a body, at least one tensioning line attached to the body, and a net attached to the at least one tensioning line for towing the net behind the intercepting vehicle. The net includes a perimeter surrounding an open-mesh matrix of fibers and at least one airfoil section disposed on the perimeter of the net, where the at least one airfoil section is arranged such that lift created by the at least one airfoil section when the net is towed behind the intercepting vehicle acts outwardly on the perimeter of the net, deploying the net into a capture orientation.

20 Claims, 7 Drawing Sheets

(56) References Cited

OTHER PUBLICATIONS

DelftDynamics, DroneCatcher continues, Apr. 4, 2016, 1 page, http://www.delftdynamics.nl/index.php/en/news-en/143-dronecatcher-ntp-uk, Published in The Netherlands.
JiJicom, Video, Japan's Drone Police, a Drone net that captures your Drone, https://www.youtube.com/watch?v=4SIBDyRhm3k, Jul. 3, 2018, Japan.
The Counter UAS Directory from www.unmannedairspace.info, 40 pages, Jul. 3, 2018, https://www.unmannedairspace.info/wp-content/uploads/2017/12/Counter-UAS-directory.-December-2017.v1.pdf.

* cited by examiner

DEPLOYABLE NET FOR AN INTERCEPTING VEHICLE

FIELD

The present disclosure generally relates to a deployable net for an intercepting vehicle and methods for operating an intercepting vehicle.

BACKGROUND

With the recent growth in drone activity, the desire to capture airborne objects has also increased. Numerous designs for capture mechanisms exist, including nets and other types of ensnaring devices. Although the precision with which a vehicle carrying such a device can be operated keeps advancing, it is still desirable to have a relatively large capture area (e.g., a relatively large net) to maximize the probability of capturing the target. The current state of the art consists of two capture mechanism categories: dragged and projected.

A dragged mechanism, such as a net or similar, is hung below the carrying aircraft, which performs a flyby attempting to ensnare the target. In order to keep the net deployed, a counter-weight is used to act against the aerodynamic drag of the net. The amount of counter-weight can easily be a significant fraction of the total aircraft weight and significantly reduces the performance of the carrying aircraft. Deployment typically consists of a latch mechanism that holds the counter-weight close to the aircraft body until the ensnaring mechanism is needed.

Projected systems use a propellant, such as compressed gas or gun powder, to launch the capture mechanism forward. These launching mechanisms can be quite large and heavy relative to the carrying vehicle's base weight. Further, these capture mechanisms only allow one capture attempt per deployment, and it is also possible for the carrying aircraft to fly into the projected capture mechanism once it is launched.

What is needed is an improved way to carry and deploy a net that may be used to capture a target object, such as an unmanned aerial vehicle.

SUMMARY

In one example, an intercepting vehicle is described including a body, at least one tensioning line attached to the body, and a net attached to the at least one tensioning line for towing the net behind the intercepting vehicle. The net includes a perimeter surrounding an open-mesh matrix of fibers and at least one airfoil section disposed on the perimeter of the net, where the at least one airfoil section is arranged such that lift created by the at least one airfoil section when the net is towed behind the intercepting vehicle acts outwardly on the perimeter of the net, deploying the net into a capture orientation.

In another example, a method of operating an intercepting vehicle is described, where the intercepting vehicle includes a body and a net attached to the body by at least one tensioning line for towing the net behind the intercepting vehicle, and where the net includes a perimeter surrounding an open-mesh matrix of fibers and at least one airfoil section disposed on the perimeter of the net. The method includes releasing the net from a stowed configuration and deploying the net into a capture orientation via a thrust of the intercepting vehicle, where the at least one airfoil section is arranged such that lift created by the at least one airfoil section when the net is towed behind the intercepting vehicle acts outwardly on the perimeter of the net.

In another example, a system for operating an intercepting vehicle is described, where the intercepting vehicle includes a body and a net attached to the body by at least one tensioning line for towing the net behind the intercepting vehicle, and where the net comprises a perimeter surrounding an open-mesh matrix of fibers and at least one airfoil section disposed on the perimeter of the net. The system includes at least one processor and a non-transitory computer readable medium having stored thereon instructions that, when executed by the at least one processor, cause the intercepting vehicle to perform functions. The functions include releasing the net from a stowed configuration and deploying the net into a capture orientation via a thrust of the intercepting vehicle, where the at least one airfoil section is arranged such that lift created by the at least one airfoil section when the net is towed behind the intercepting vehicle acts outwardly on the perimeter of the net.

The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Disclosed examples will now be described more fully with reference to the accompanying Figures, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples discussed herein include an intercepting vehicle and methods for operating the intercepting vehicle. The intercepting vehicle includes a body and a net attached to the body for towing the net behind the intercepting vehicle. The net includes at least one airfoil section disposed on a perimeter of the net, where the at least one airfoil section is arranged such that lift created by the airfoil section(s) when the net is towed behind the intercepting vehicle acts outwardly on the perimeter of the net.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
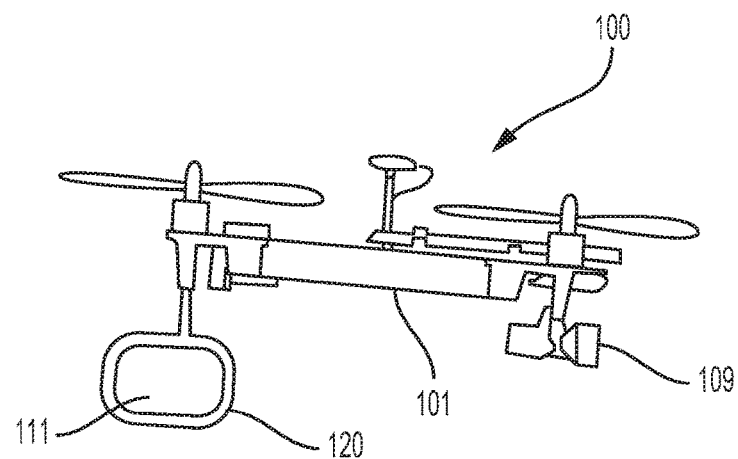
FIG. 1 illustrates a side view of an example intercepting vehicle including a net in a stowed configuration, according to an example implementation.
Figure 2:
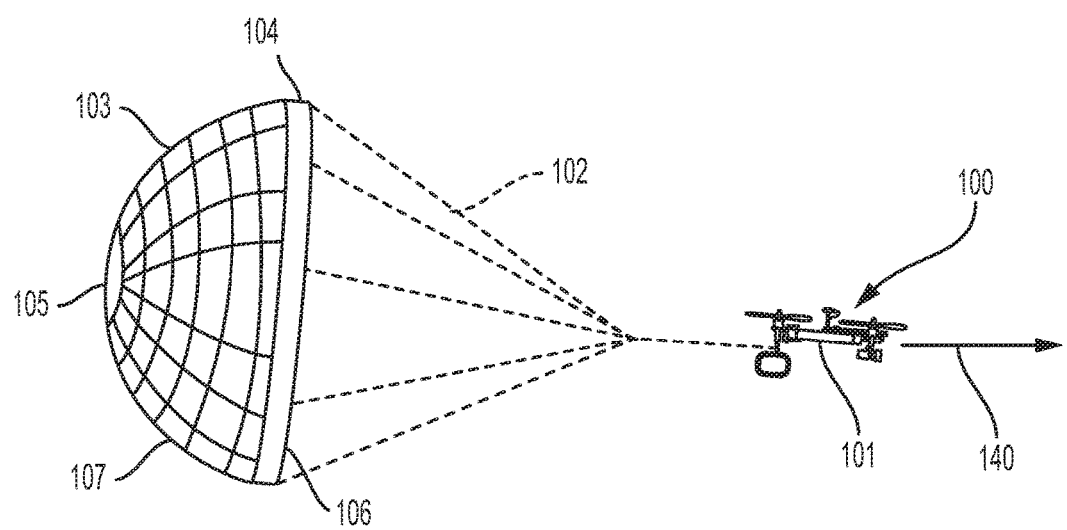
FIG. 2 illustrates a side view of an example intercepting vehicle including a net deployed in a capture orientation, according to an example implementation.
Figure 3:
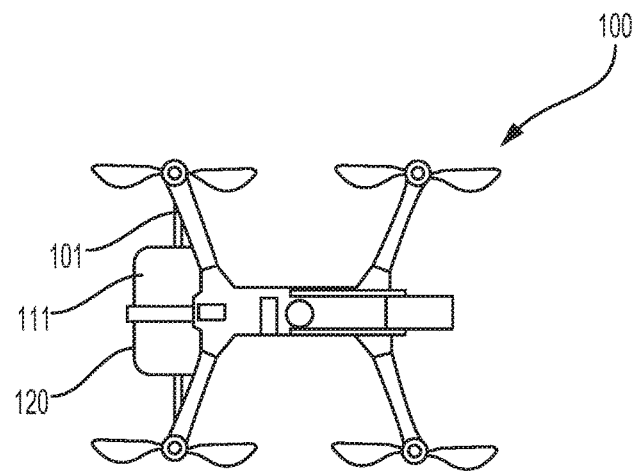
FIG. 3 illustrates a top view of an example intercepting vehicle including a net in a stowed configuration, according to an example implementation.
Figure 4:
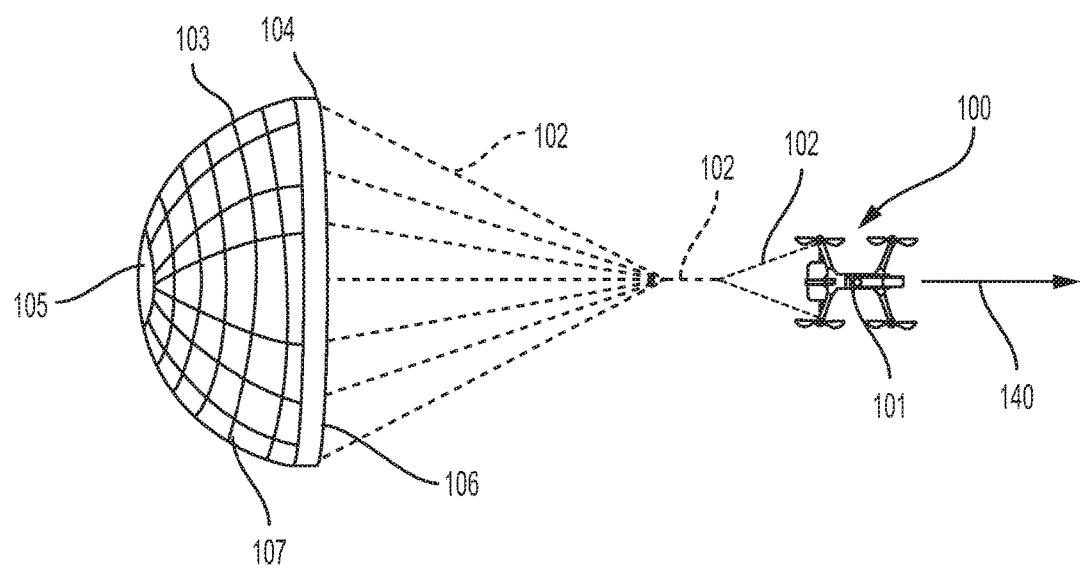
FIG. 4 illustrates a top view of an example intercepting vehicle including a net deployed in a capture orientation, according to an example implementation.
Figure 5:
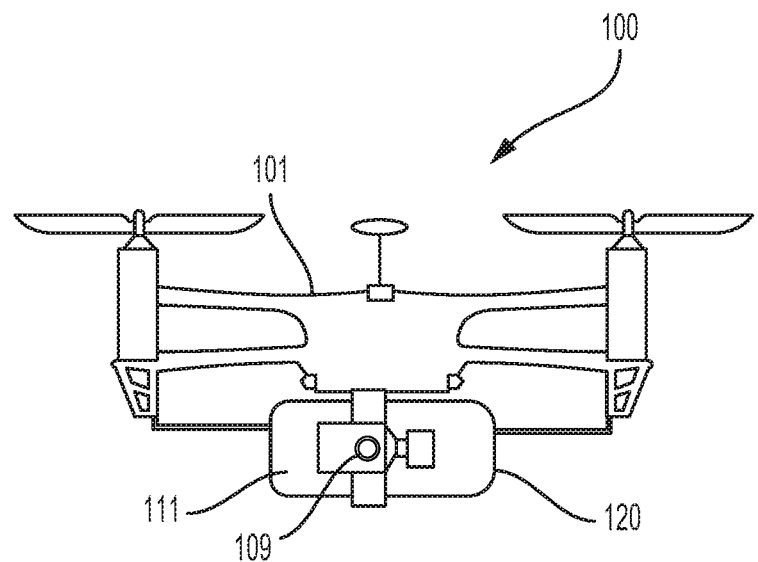
FIG. 5 illustrates a front view of an example intercepting vehicle including a net in a stowed configuration, according to an example implementation.

Referring now to FIGS. 1-2, a side view of an intercepting vehicle 100 is shown, according to an example implementation. In FIG. 1, a net 103 attached to the intercepting vehicle 100 is in a stowed configuration and is not shown, whereas the net 103 is deployed in FIG. 2. FIGS. 3-4 show a top view of the intercepting vehicle 100, with the net 103 stowed and deployed, respectively. Similarly, FIGS. 5-6 show a front view of the intercepting vehicle 100, with the net 103 stowed and deployed, respectively.

The example intercepting vehicle 100 shown in FIGS. 1-6 is a rotary-wing aerial vehicle, however numerous other vehicle types are also contemplated herein. For instance, the intercepting vehicle 100 may be a fixed-wing aircraft, among other aircraft configurations. In some other implementations, the intercepting vehicle 100 discussed herein might be a submersible vehicle or a ground-based vehicle.

As shown in FIGS. 1-6, the intercepting vehicle 100 includes a body 101. For example, the body 101 may include the rotors, wings, and other numerous components that contribute to the operation of the intercepting vehicle. For instance, the body 101 of the intercepting vehicle 100 may include one or more sensors for collecting data, such as the imaging device 109 shown in FIG. 1. Other possibilities also exist.

Figure 6:
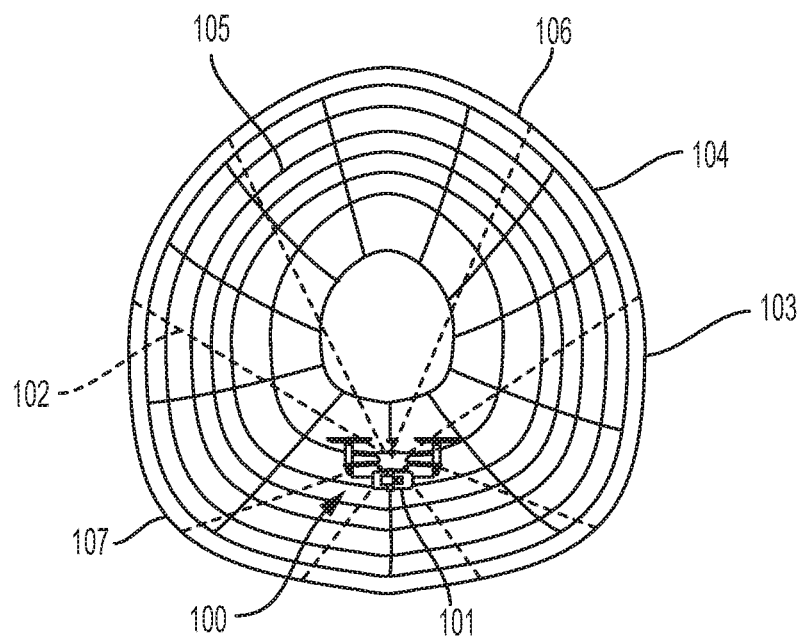
FIG. 6 illustrates a front view of an example intercepting vehicle including a net deployed in a capture orientation, according to an example implementation.

The intercepting vehicle 100 also includes a net 103, which may be deployed and towed behind the intercepting vehicle 100, as shown in FIGS. 2, 4 and 6. For instance, the intercepting vehicle 100 may include at least one tensioning line 102 attached to the body 101, and the net 103 may be attached to an opposite end of the at least one tensioning line 102. In some implementations, the net 103 may be collapsible into a stowed configuration 111, as seen in FIGS. 1, 3 and 5. For instance, a container 120 may be coupled to an aft portion of the body 101 for stowing the net 103 in the stowed configuration 111. Other locations for the container 120 are also possible. The net 103 may then be deployable from the container 120 via a thrust 140 of the intercepting vehicle 100, which can be seen in FIGS. 2 and 4.

For example, in some implementations, the net 103 may be folded within the container 120, which may remain closed until deployment of the net 103. In such an implementation, the container 120 may include a latch or similar release that can be articulated to open the container 120. In some examples, the container 120 might be opened via a spring-loaded hinge, which may also bias the net 103 out of the container 120. Further, in some examples, the aerodynamic drag of the net 103 caused by the thrust 140 of the intercepting vehicle 100 may be sufficient to deploy the net 103 from the container 120. In some other examples, the deployment of the net 103 may resemble the deployment of some parachutes, wherein a relatively small, low-drag parachute is attached to the net 103 and is released from the container 120 first, helping to draw the net 103 out of the container 120. Other examples for deploying the net 103 from the container 120 are also possible.

The container 120 might take other forms as well. For instance, the net 103 may be folded or otherwise collapsed into the stowed configuration 111 and held in place on the body 101 of the intercepting vehicle 100 by one or more clips or other fasteners, which may then be released in a similar fashion to opening the container 120. Other arrangements for maintaining the net 103 in the stowed configuration 111 prior to deployment are also possible.

The net 103 includes a perimeter 104 surrounding an open-mesh matrix of fibers 105, which can be seen in FIGS. 2, 4, and 6. The open-mesh matrix of fibers 105 may be formed from a relatively lightweight material, and may include a spacing that is tailored to an anticipated task. For instance, if it is anticipated that the intercepting vehicle 100 shown in FIGS. 1-6 will be using the net 103 to intercept a similarly sized target, the open-mesh matrix of fibers 105 that is stowed on the intercepting vehicle 100 may be relatively sparse, providing for reduced weight and a relatively lower performance impact. A net 103 with a denser open-mesh matrix of fibers 105 may be utilized for smaller anticipated targets, and so on.

At least one airfoil section 106 is disposed on the perimeter 104 of the net 103, which may function to open the net 103 as it trails the intercepting vehicle 100. In particular, the thrust provided by the intercepting vehicle 100 is transferred to the perimeter 104 of the net 103 via the attachment of the at least one tensioning line 102. The at least one airfoil section 106 is arranged such that lift created by the at least one airfoil section 106 when the net 103 is towed behind the intercepting vehicle 100 acts outwardly on the perimeter 104 of the net 103, deploying the net 103 into a capture orientation 107.

For example, the perimeter 104 of the net 103 shown in the example of FIGS. 2, 4, and 6 may be substantially circular, as seen most clearly in FIG. 6. Thus, the at least one airfoil section 106 disposed on the perimeter 104 is arranged such that the aerodynamic lift force created by the at least one airfoil section 106 acts on the perimeter 104 in a radially outward direction to open the net 103. Further, in some implementations, the at least one airfoil section 106 may include a continuous airfoil section 106 surrounding the perimeter 104 of the net 103. In this regard, the aerodynamic lift created by the at least one airfoil section 106 will act in a different direction depending on the location of the at least one airfoil section 106 on the perimeter 104. For example, the aerodynamic lift force will act on a top portion of the perimeter 104 in an upward direction relative to the forward movement of the intercepting vehicle 100. However, the aerodynamic lift force will act laterally on side portions of the perimeter 104, forcing the opposing sides of the net away from each other, and may act in a downward direction on a bottom portion of the perimeter 104.

Figure 7:
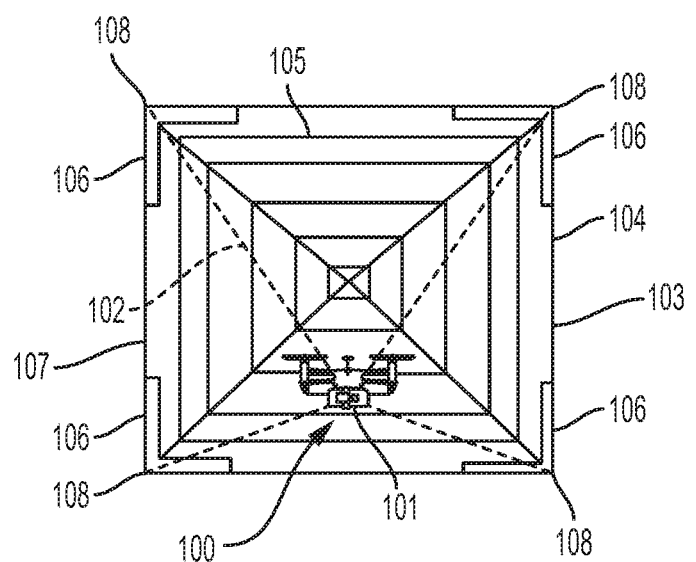
FIG. 7 illustrates a front view of an example intercepting vehicle including a net deployed in a capture orientation, according to another example implementation.

Other configurations of the net 103 and the at least one airfoil section 106 are also possible. For example, FIG. 7 shows a front view of an example intercepting vehicle 100 where the perimeter 104 of the net 103 is substantially rectangular. Further, the at least one airfoil section 106 is not continuous around the perimeter 104, but rather includes a plurality of airfoil sections 106 disposed on opposing corners 108 of the perimeter 104. In this arrangement, the opposing corners 108 will be forced away from each other, tending to open the net 103 into the capture orientation 107 as the intercepting vehicle 100 tows the net 103 behind it. Numerous other shapes are possible for net 103 and its perimeter 104, as well as the other configurations for the at least one airfoil section 106.

Figure 8:
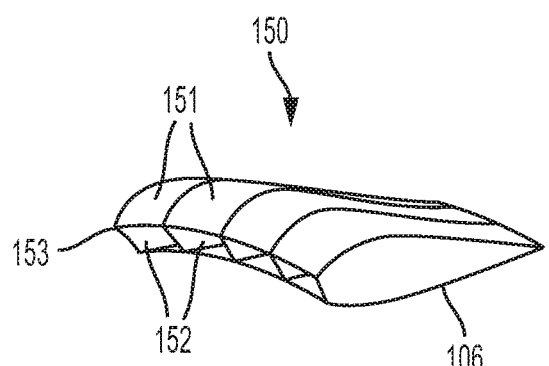
FIG. 8 illustrates a perspective view of an example airfoil section in the form of a parafoil, according to an example implementation.

In some implementations as otherwise described herein, the at least one airfoil section 106 may be formed from a compliant material that facilitates packing the at least one airfoil section 106 down to a relatively small size when the net 103 is stowed. For example, the at least one airfoil section 106 may include a parafoil 150 that is formed from a non-rigid material, such as a nylon or polyester. FIG. 8 illustrates a perspective view of an example airfoil section 106 in the form of a parafoil 150, including a plurality of adjacent cells 151, each cell 151 having an opening 152 at the leading edge 153 of the parafoil 150. Accordingly, the parafoil 150 is inflatable via ram-air inflation caused by the thrust 140 of the intercepting vehicle 100. As shown in FIG. 8, the inflated parafoil 150 has the shape of an airfoil section 106, and may generally maintain its shape so long as air continues to flow through the parafoil 150. Numerous other arrangements for the parafoil 150 are also possible.

Figure 9:
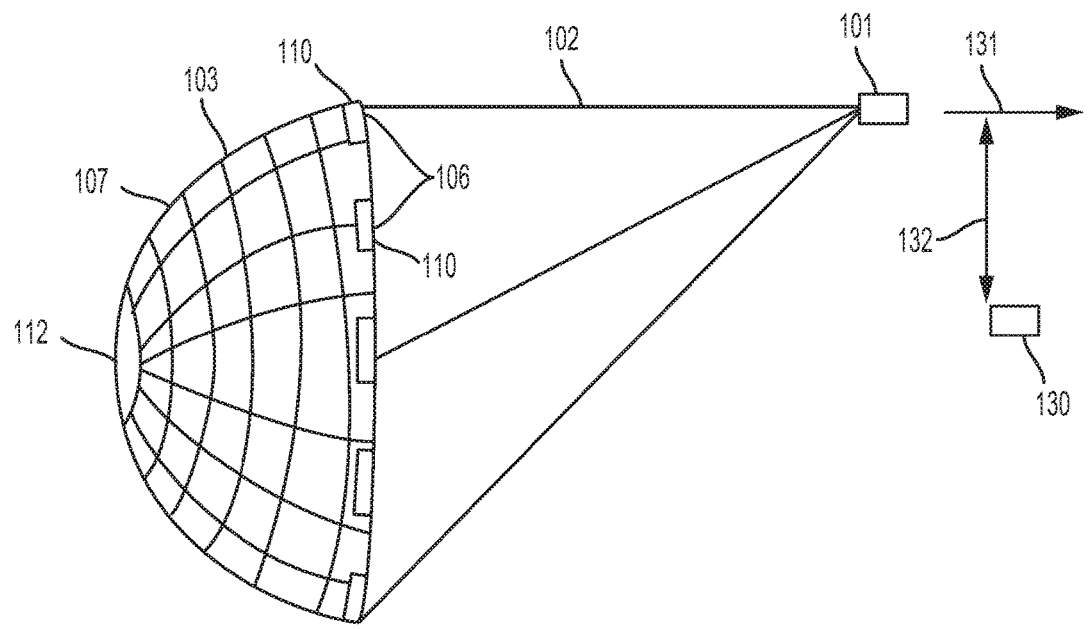
FIG. 9 illustrates a schematic view of an example intercepting vehicle including a net deployed in a capture orientation, according to an example implementation.

The at least one airfoil section 106 may allow for the collapsibility and stowabilty of the net 103 in other ways as well. For instance, FIG. 9 shows a schematic view of an example intercepting vehicle 100 including a net 103 deployed in a capture orientation 107, where the at least one airfoil section 106 is formed from a rigid material arranged in a plurality of discontinuous segments 110. This may facilitate folding or otherwise packing the net 103 into the stowed configuration 111. For example, the rigid material of the at least one airfoil section 106 may be balsa wood or a relatively lightweight plastic. Other suitable materials are also possible.

The plurality of discontinuous segments 110 may be arranged around the perimeter 104 of the net 103. In some cases, they may be substantially evenly distributed as in the example shown in FIG. 9, which may include a circular net 103 as discussed above. In other examples, the plurality of discontinuous segments 110 may be positioned at particular points on the perimeter of the net 103, in order to bias the net 103 into a particular capture orientation 107 when it is towed behind the intercepting vehicle 100.

Further, the shape of the at least one airfoil section 106 may differ at various points around the perimeter 104 of the net 103, in order to generate a different aerodynamic lift force on different points of the perimeter 104. In this way, it may be possible to establish a particular capture orientation 107 of the net 103 relative to the intercepting vehicle 100 when it is towed behind the intercepting vehicle 100.

For instance, the example shown in FIG. 9 illustrates the intercepting vehicle 100 moving along a capture path 131 to intercept a target 130. The net 103 is deployed behind the body 101 of the intercepting vehicle 100 in a capture orientation 107 that is offset from the capture path 131. For example, a center 112 of the net 103 may be offset from the capture path 131. Accordingly, the capture path 131 of the intercepting vehicle 100 may be offset by a distance 132 from the target 130 such that the net 103 in the capture orientation 107 is aimed to capture the target 130 substantially at the center 112 of the net 103. In some implementations, an offset configuration as shown in FIG. 9 may decrease the likelihood that the body 101 of the intercepting vehicle 100 will collide with the target 130.

In the example of FIG. 9, the offset capture orientation 107 of the net 103 may be accomplished in part by the positioning of the at least one airfoil section 106 around the perimeter 104, and/or the shape of the individual airfoil section 106 at each position. For example, the at least one airfoil section 106 shown in FIG. 9 may generate a greater downward aerodynamic force (and/or a lesser upward force) than the example shown in FIG. 2, in which the capture orientation 107 of the net 103 relative to the intercepting vehicle 100 is not offset, but rather trails more directly behind the intercepting vehicle 100.

As shown in FIG. 9, there are three tensioning lines 102 attached between the net 103 to the body 101 of the intercepting vehicle 100, each with a dissimilar length. Accordingly, the relative lengths of the tensioning lines 102 may also contribute to establishing the capture orientation 107 of the net 103 relative to the intercepting vehicle 100 when it is deployed.

In some implementations, it may be desirable to adjust the capture orientation 107 of the net 103 relative to the intercepting vehicle 100 during operation, after the net 103 has been deployed. For instance, adjustability of the net 103 may allow the intercepting vehicle 100 to compensate for localized wind gusts. In some cases, the at least one tensioning line 102 may include at least three tensioning lines 102 attached between the net 103 and the intercepting vehicle 100. Further, at least one of the at least three tensioning lines 102 may be independently retractable by the intercepting vehicle 100 so as to change the capture orientation 107 of the net 103 relative to the intercepting vehicle 100. For instance, one or more of the tensioning lines 102 may be attached to the body 101 of the intercepting vehicle 100 via a respective spool that may be independently wound to retract the tensioning line 102. Other, similar devices may be used as well.

Figure 10:
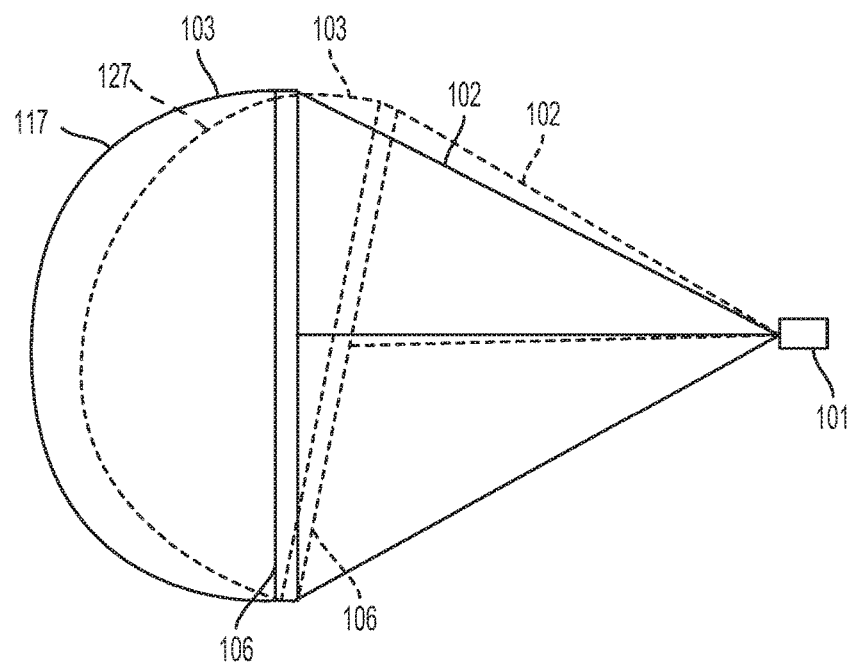
FIG. 10 illustrates a schematic view of an example intercepting vehicle including a net deployed in a first capture orientation and a second capture orientation, according to an example implementation.

Illustrating an example of this implementation, FIG. 10 shows a schematic view of an intercepting vehicle 100 including a net 103 attached to the body 101 by three tensioning lines 102 and deployed in a first capture orientation 117, all shown in solid lines. After deployment of the net 103, and as discussed above, the upper-most tensioning line 102 shown in FIG. 10 may be shortened by retracting a portion of the tensioning line 102 at the body 101, thereby changing the orientation of the tensioning line 102, as shown in by the dashed lines in FIG. 10. Similarly, the middle tensioning line 102 may also be retracted, but to a lesser degree than the upper-most tensioning line 102. As a result, the orientation of the net 103 relative to the intercepting vehicle may be changed to a second orientation 127, shown by dashed lines.

Figure 11:
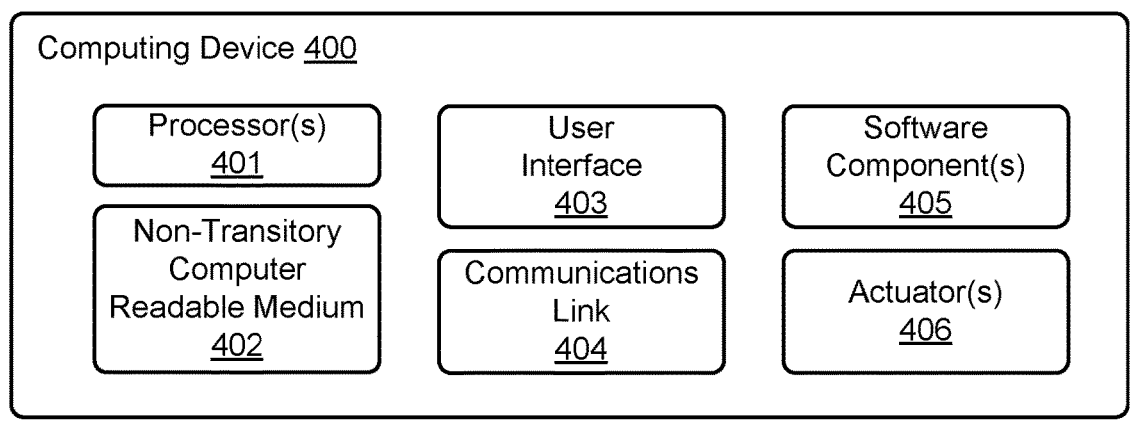
FIG. 11 illustrates a block diagram of an example computing device, according to an example implementation.

FIG. 11 illustrates a block diagram of an example computing device 400 that may be used to implement some or all of the operations discussed herein. For instance, the computing device 400 may be an onboard computer located on the body 101 of the intercepting vehicle 100, or it may be a remote computer that is communicatively coupled to the intercepting vehicle 100. Further, the computing device 400 shown in FIG. 11 might not be embodied by a single device, but may represent a combination of computing devices that may or may not be in the same location.

The computing device 400 may include one or more processors 401 and a non-transitory, computer readable medium 402 that includes instructions that are executable by the one or more processors 401. The one or more processors 401 are coupled to or configured to be in communication with the non-transitory, computer readable medium 402. The non-transitory, computer readable medium 402 may include other data storage as well, such as navigation or positioning data. For example, the intercepting vehicle 100 may store positioning data in the non-transitory, computer readable medium 402 corresponding to an operating zone of the intercepting vehicle 100.

In some implementations, the computing device 400 may include a user interface 403 for receiving inputs from a user, and/or for outputting operational data to a user. The one or more processors 401 are coupled to or configured to be in communication with the user interface 403. The user interface 403 might take the form of a graphical user interface at a remote location, for example, connected to the intercepting vehicle 100 via a communications link 404, among other examples. For instance, a command to deploy the net 103 from the stowed configuration 111 may be received from a remote user via the user interface 403. The command may be received by the intercepting vehicle 100 via the communications link 404 (and the one or more processors 401 are coupled to or configured to be in communication with the communications link 404). In other examples, the deployment process might be initiated automatically, based on pre-determined parameters stored on the non-transitory, computer readable medium 402, such as a proximity to the target 130. Other possibilities also exist.

In addition, the non-transitory, computer readable medium 402 may be loaded with one or more software components 405 stored on the computer readable medium 402 and executable by the processor(s) 401 to achieve certain functions. For example, the intercepting vehicle 100 may include various systems that contribute to its operation, such as a navigation system, an imaging and recognition system, an avionics system, among other examples. Each of these systems may be operated in part by software components 405 housed on the non-transitory, computer readable medium 402 and executable by the processor(s) 401.

The computing device 400 may also include, or be in communication with, one or more actuators 406 located on the body 101 of the intercepting vehicle 100. The actuator(s) 406 may be controlled by the software components, for example, and may be actuated to control the deployment of the net 103 from the container 120, the retraction or paying out of the one or more tensioning lines 102 to adjust the orientation of the net 103, and the detachment of the one or more tensioning lines 102, among other possibilities.

Figure 12:
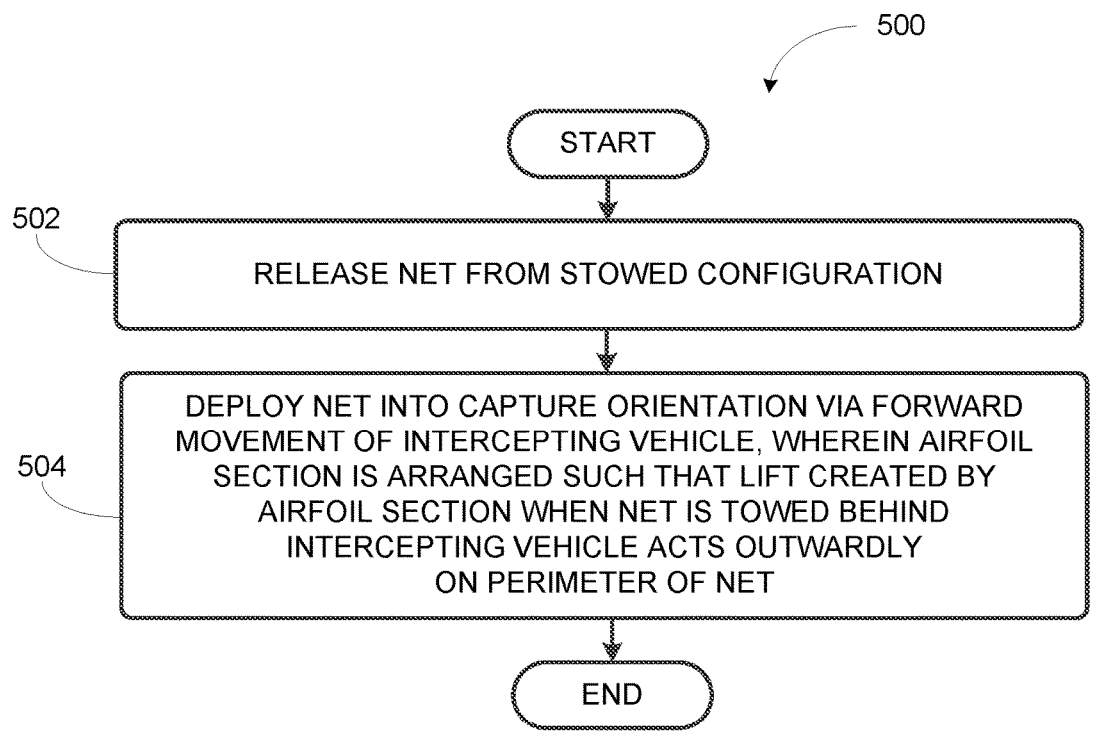
FIG. 12 shows a flowchart of an example method for operating an intercepting vehicle, according to an example implementation.

Turning now to FIG. 12, a flowchart of a method 500 for operating an intercepting vehicle is shown, according to an example implementation. Method 500 shown in FIG. 12 presents an example of a method that, for instance, could be used with the intercepting vehicle 100, as shown in FIGS. 1-11 and discussed herein. It should be understood that for this and other processes and methods disclosed herein, flowcharts show functionality and operation of one possible implementation of present examples. In this regard, each block in a flowchart may represent a module, a segment, or a portion of program code, which includes one or more instructions executable by a processor, such as the processor(s) 401 of the computing device 400, for implementing or causing specific logical functions or steps in the process. Alternative implementations are included within the scope of the examples of the present disclosure, in which functions may be executed out of order from that shown or discussed, including substantially concurrently, depending on the functionality involved, as would be understood by those reasonably skilled in the art.

As discussed above, the intercepting vehicle 100 of method 500 includes a body 101 and a net 103 attached to the body 101 by at least one tensioning line 102 for towing the net 103 behind the intercepting vehicle 100. The net 103 includes a perimeter 104 surrounding an open-mesh matrix of fibers 105 and at least one airfoil section 106 disposed on the perimeter 104 of the net 103.

At block 502, the method 500 includes releasing the net 103 from a stowed configuration 111. For instance, as noted above and shown in FIGS. 1-7, the intercepting vehicle 100 may include a container 120 coupled to the body 101 for stowing the net 103 in the stowed configuration 111, which may include folding or otherwise collapsing the net to a relatively compact size. Accordingly, releasing the net 103 from the stowed configuration 111 may include releasing the net 103 from the container 120. Moreover, the net 103 may be secured to the body 101 of the intercepting vehicle 100 in other ways as well, which may not include an enclosure such as the container 120, as discussed above.

At block 504, the method 500 includes deploying the net 103 into a capture orientation 107 via a thrust 140 of the intercepting vehicle 100. For instance, as noted previously, the at least one airfoil section 106 is arranged such that lift created by the at least one airfoil section 106 when the net 103 is towed behind the intercepting vehicle 100 acts outwardly on the perimeter 104 of the net 103. In some examples, the at least one airfoil section 106 includes a parafoil 150 formed from a non-rigid material, including a plurality of adjacent cells 151, each cell 151 having an opening 152 at the leading edge 153 of the parafoil 150, as show in FIG. 8 and discussed above. Thus, deploying the net 103 into the capture orientation 107 may include inflating the parafoil 150 via ram-air inflation caused by the thrust 140 of the intercepting vehicle 100.

As noted previously, the capture orientation 107 of the net 103 relative to the intercepting vehicle 100 may be established by the location of the at least one airfoil section 106 on the perimeter 104 of the net 103, the shape of the various airfoil sections 106 at different locations on the perimeter 104, the relative lengths of the one or more tensioning lines 102, or any combination of these or other variables.

In an example implementation, at least three tensioning lines 102 may be attached between the net 103 and the intercepting vehicle 100. After deploying the net 103 into a capture orientation 107, the method 500 may include independently retracting at least one of the at least three tensioning lines 102 so as to change the capture orientation 107 of the net 103 relative to the intercepting vehicle 100, as shown in FIG. 10 and discussed above.

After deploying the net 103 into a capture orientation 107, the method 500 may include moving the intercepting vehicle 100 along a capture path 131 relative to a target 130 such that the deployed net 103 contacts the target 130. An example is shown in FIG. 9 where the capture path 131 is offset from the target 130 by a distance 132, which generally corresponds to the offset of the capture orientation 107 of the net 103 relative to the intercepting vehicle 100. As noted above, this may decrease the likelihood that the body 101 of the intercepting vehicle 100 collides with the target 130.

Accordingly, the method 500 may further include determining the capture path 131 for the intercepting vehicle 100 relative to the target 130. In some cases, the capture path 131 may be determined remotely, by the computing device 400, and then transmitted to the intercepting vehicle 100.

For instance, the intercepting vehicle 100 may transmit ongoing imaging data, among other sensor data that it collects, to the computing device 400. The computing device 400 may determine and continuously update the capture path 131 based on the ongoing data it receives form the intercepting vehicle 100, and perhaps from other data sources as well. The computing device 400 may then transmit data indicating the capture path 131, which may be updated on an ongoing basis based on the most recent sensor data obtained.

In some cases, the interior surface (i.e., the leading surface) of the net 103 may contact the target 130, which may cause the target to become entangled in the net 103. In other cases, due to the unpredictability of the movement of the target 130, among other factors, the target 130 may contact one of the tensioning lines 102, or make contact with the exterior surface (i.e., the trailing surface) of the net 103. The target 130 may become entangled nonetheless, which may be considered a successful capture of the target 130.

After the capture of the target 130, the intercepting vehicle 100 may take a number of different actions. For example, if the target 130 is relatively heavy relative to the intercepting vehicle 100, it may not be possible for the intercepting vehicle 100 to carry the entangled target 130. Thus, in the case of an aerial intercepting vehicle 100, the capture of the target 130 may result in an uncontrolled fall of both the target 130 and the intercepting vehicle 100. Alternatively, the intercepting vehicle 100 may carry the target 130 to a designated disposal point. In some cases, the method 500 may include the intercepting vehicle 100 detaching the at least one tensioning line 102 from the body 101 of the intercepting vehicle 100. Other possibilities also exist. In some implementations, it may be possible for the intercepting vehicle 100 to stow more than one net 103, allowing the intercepting vehicle to execute a series of deployments during operation.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An intercepting vehicle comprising:
    a body;
    at least three tensioning lines attached to the body; and
    a net attached to the at least three tensioning lines for towing the net behind the intercepting vehicle, wherein the net comprises:
        a perimeter surrounding an open-mesh matrix of fibers; and
        at least one airfoil section disposed on the perimeter of the net, wherein the at least one airfoil section is arranged such that lift created by the at least one airfoil section when the net is towed behind the intercepting vehicle acts outwardly on the perimeter of the net, deploying the net into a capture orientation,
    wherein at least one of the at least three tensioning lines is independently retractable by the intercepting vehicle so as to change the capture orientation of the net relative to the intercepting vehicle.

2. The intercepting vehicle of claim 1, wherein the perimeter of the net is substantially circular, and wherein the at least one airfoil section comprises a continuous airfoil section surrounding the perimeter of the net.

3. The intercepting vehicle of claim 1, wherein the perimeter of the net is substantially rectangular, and wherein the at least one airfoil section comprises a plurality of airfoil sections disposed on opposing corners of the perimeter of the net.

4. The intercepting vehicle of claim 1, wherein the intercepting vehicle is an aerial vehicle.

5. The intercepting vehicle of claim 1, wherein the at least one airfoil section comprises a parafoil formed from a non-rigid material, and wherein the parafoil is inflatable via ram-air inflation caused by a thrust of the intercepting vehicle.

6. The intercepting vehicle of claim 1, wherein the at least one airfoil section is formed from a rigid material arranged in a plurality of discontinuous segments.

7. The intercepting vehicle of claim 1, wherein the net is collapsible into a stowed configuration, the intercepting vehicle further comprising:
    a container coupled to the body for stowing the net in the stowed configuration, wherein the net is deployable from the container via a thrust of the intercepting vehicle.

8. A method of operating an intercepting vehicle, wherein the intercepting vehicle comprises a body and a net attached to the body by at least three tensioning lines for towing the net behind the intercepting vehicle, and wherein the net comprises a perimeter surrounding an open-mesh matrix of fibers and at least one airfoil section disposed on the perimeter of the net, the method comprising:
    releasing the net from a stowed configuration;
    deploying the net into a capture orientation via a thrust of the intercepting vehicle, wherein the at least one airfoil section is arranged such that lift created by the at least one airfoil section when the net is towed behind the intercepting vehicle acts outwardly on the perimeter of the net; and
    after deploying the net into the capture orientation, independently retracting at least one of the at least three tensioning lines so as to change the capture orientation of the net relative to the intercepting vehicle.

9. The method of claim 8, wherein the intercepting vehicle further comprises a container coupled to the body for stowing the net in the stowed configuration, and wherein releasing the net from the stowed configuration comprises releasing the net from the container.

10. The method of claim 8, further comprising:
    after deploying the net into a capture orientation, moving the intercepting vehicle along a capture path relative to a target such that the deployed net contacts the target.

11. The method of claim 8, further comprising:
    detaching the at least three tensioning lines from the body of the intercepting vehicle.

12. The method of claim 8, wherein the at least one airfoil section comprises a parafoil formed from a non-rigid material, and wherein deploying the net into a capture orientation comprises inflating the parafoil via ram-air inflation caused by the thrust of the intercepting vehicle.

13. A system for operating an intercepting vehicle, wherein the intercepting vehicle comprises a body and a net attached to the body by at least three tensioning lines for towing the net behind the intercepting vehicle, and wherein the net comprises a perimeter surrounding an open-mesh matrix of fibers and at least one airfoil section disposed on the perimeter of the net, the system comprising:
- at least one processor; and
- a non-transitory computer readable medium having stored thereon instructions that, when executed by the at least one processor, cause the intercepting vehicle to perform functions comprising:
  - releasing the net from a stowed configuration;
  - deploying the net into a capture orientation via a thrust of the intercepting vehicle, wherein the at least one airfoil section is arranged such that lift created by the at least one airfoil section when the net is towed behind the intercepting vehicle acts outwardly on the perimeter of the net; and
  - after deploying the net into the capture orientation, independently retracting at least one of the at least three tensioning lines so as to change the capture orientation of the net relative to the intercepting vehicle.

14. The system of claim 13, wherein the intercepting vehicle further comprises a container coupled to the body for stowing the net in the stowed configuration, and wherein releasing the net from the stowed configuration comprises releasing the net from the container.

15. The system of claim 13, wherein the instructions, when executed by the at least one processor, further cause the intercepting vehicle to perform functions comprising:
- after deploying the net into the capture orientation, moving along a capture path relative to a target such that the deployed net contacts the target.

16. The system of claim 13, wherein the instructions, when executed by the at least one processor, further cause the intercepting vehicle to perform functions comprising:
- detaching the at least three tensioning lines from the body of the intercepting vehicle.

17. The system of claim 13, wherein the at least one airfoil section comprises a parafoil formed from a non-rigid material, and wherein deploying the net into a capture orientation comprises inflating the parafoil via ram-air inflation caused by the thrust of the intercepting vehicle.

18. The intercepting vehicle of claim 1, wherein multiple of the at least three tensioning lines are independently retractable by the intercepting vehicle so as to change the capture orientation of the net relative to the intercepting vehicle.

19. The method of claim 8, further comprising:
- after deploying the net into the capture orientation, independently retracting multiple of the at least three tensioning lines so as to change the capture orientation of the net relative to the intercepting vehicle.

20. The system of claim 13, wherein the instructions, when executed by the at least one processor, further cause the intercepting vehicle to perform functions comprising:
- after deploying the net into the capture orientation, independently retracting multiple of the at least three tensioning lines so as to change the capture orientation of the net relative to the intercepting vehicle.

* * * * *